US012780721B2

(12) United States Patent
Kim et al.

(10) Patent No.: US 12,780,721 B2
(45) Date of Patent: Nov. 3, 2026

(54) MAGNETIC HEATING ELEMENT, INDUCTION HEATING TYPE ADHESIVE COMPRISING SAME, AND MANUFACTURING METHOD FOR MAGNETIC HEATING ELEMENT

(71) Applicant: LG ELECTRONICS INC., Seoul (KR)

(72) Inventors: Soongil Kim, Seoul (KR); Hongcheol Lee, Seoul (KR); Hongjung Kim, Seoul (KR); Jongdeok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 972 days.

(21) Appl. No.: 18/001,847

(22) PCT Filed: Jun. 15, 2020

(86) PCT No.: PCT/KR2020/007702
§ 371 (c)(1),
(2) Date: Dec. 14, 2022

(87) PCT Pub. No.: WO2021/256572
PCT Pub. Date: Dec. 23, 2021

(65) Prior Publication Data
US 2023/0257298 A1 Aug. 17, 2023

(51) Int. Cl.
*C03C 8/14* (2006.01)
*C01G 51/40* (2025.01)
(Continued)

(52) U.S. Cl.
CPC ................ *C03C 8/14* (2013.01); *C01G 51/40* (2013.01); *C03C 4/00* (2013.01); *H05B 6/105* (2013.01);
(Continued)

(58) Field of Classification Search
CPC ......... C03C 8/14; C03C 4/00; C03C 2204/00; C03C 2205/00; C01G 51/40; H05B 6/105;
(Continued)

(56) References Cited

U.S. PATENT DOCUMENTS

2012/0279712 A1* 11/2012 Rogin .................... C09K 8/805 427/127
2017/0203972 A1* 7/2017 Schwartz ............. H01Q 17/004

FOREIGN PATENT DOCUMENTS

KR 10-1877498 8/2018

OTHER PUBLICATIONS

Korean Intellectual Property Office Application No. 10-2023-7000167, Notice of Allowance dated Sep. 6, 2024, 2 pages.
(Continued)

*Primary Examiner* — Andrew J. Oyer
(74) *Attorney, Agent, or Firm* — LEE, HONG, DEGERMAN, KANG & WAIMEY

(57) ABSTRACT

The present disclosure relates to a magnetic heating element, an induction heating-type adhesive including the same, and a method of preparing the magnetic heating element. The magnetic heating element according to an embodiment of the present disclosure has a composition with an atomic ratio represented by the following formula, (Ma1−x−yMbxFey)1Fe2−zMczO4, wherein: Ma is cobalt (Co), Mb is one or more of zinc (Zn), Copper (Cu), Manganese (Mn), and Magnesium (Mg), and Mc is one or more of samarium (Sm), yttrium (Y), cerium (Ce), europium (Eu), neodymium (Nd), and dysprosium (Dy); $0.01 \leq x < 0.6$, $0 \leq y \leq 0.4$, $x+y<1$, $0 \leq z \leq 0.5$; and the magnetic heating element has a grain size of 40 nm to 500 nm, and powder of the magnetic heating element has a particle size of 100 nm to 30 μm. Accordingly, the adhesive including the magnetic heating element may
(Continued)

improve adhesive performance and provide high-speed bonding.

9 Claims, 8 Drawing Sheets

(51) Int. Cl.
*C03C 4/00* (2006.01)
*H05B 6/10* (2006.01)

(52) U.S. Cl.
CPC ...... *C01P 2002/54* (2013.01); *C01P 2002/60* (2013.01); *C01P 2004/03* (2013.01); *C01P 2004/10* (2013.01); *C01P 2004/32* (2013.01); *C01P 2004/61* (2013.01); *C01P 2004/62* (2013.01); *C01P 2006/42* (2013.01); *C03C 2204/00* (2013.01); *C03C 2205/00* (2013.01)

(58) Field of Classification Search
CPC ....... H05B 6/106; H05B 6/36; C01P 2002/54; C01P 2002/60; C01P 2004/03; C01P 2004/10; C01P 2004/32; C01P 2004/61; C01P 2004/62; C01P 2006/42; C04B 35/6267; C04B 2235/3206; C04B 2235/3224; C04B 2235/3225; C04B 2235/3262; C04B 2235/3275; C04B 2235/3281; C04B 2235/3284; C04B 2235/5276; C04B 2235/528; C04B 2235/5436; C04B 2235/5445; C04B 2235/5454; C04B 35/2608; C04B 35/265; H01F 1/113; H01F 1/153; H01F 1/20; H01F 1/37; B22F 1/054; B22F 9/04; C09J 5/06; C22C 2202/02
See application file for complete search history.

(56) References Cited

OTHER PUBLICATIONS

Gomez-Polo et al., "Self-Regulated Magnetic Induction Heating of Zn—Co Ferrite Nanoparticles," IEEE International Magnetics Conference (2015), 2 pages.
Korean Intellectual Property Office Application No. 10-2023-7000167, Office Action dated May 23, 2024, 4 pages.

* cited by examiner

【Figure 1】
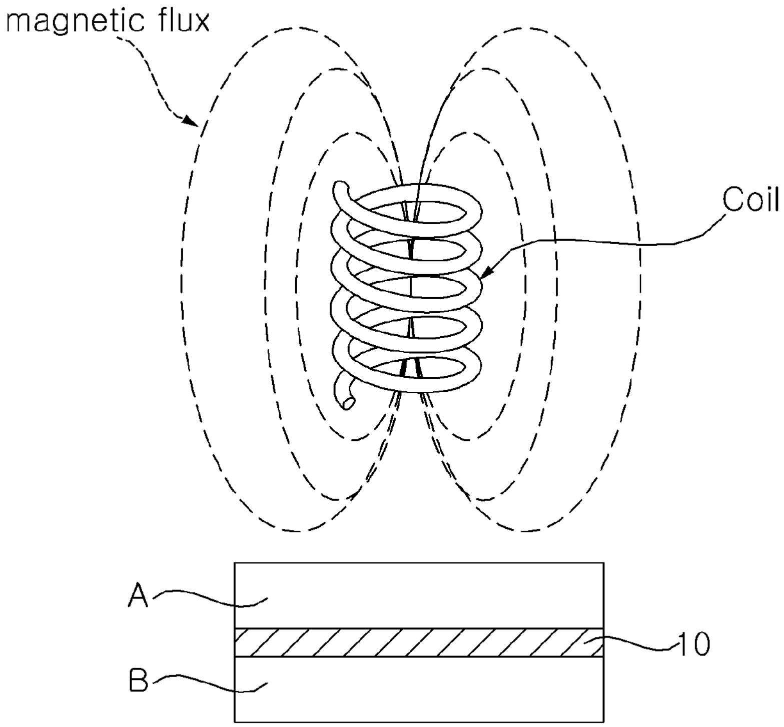

【Figure 2】
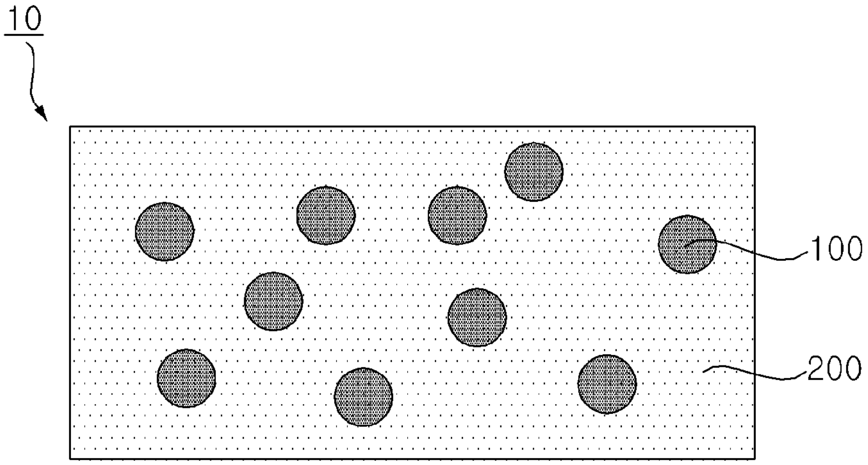
(a)
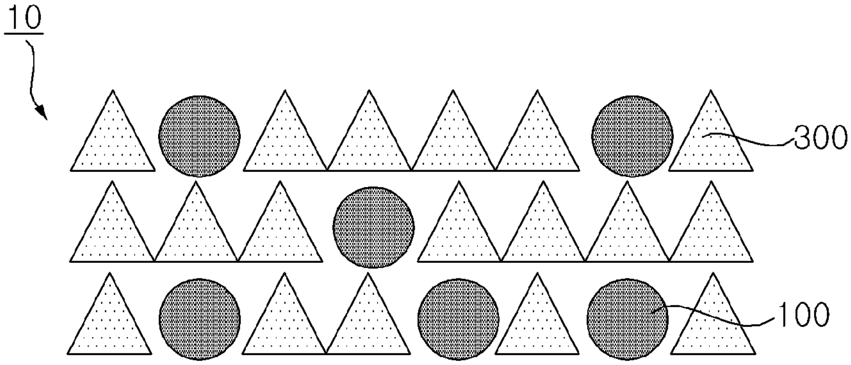
(b)

【Figure 3】
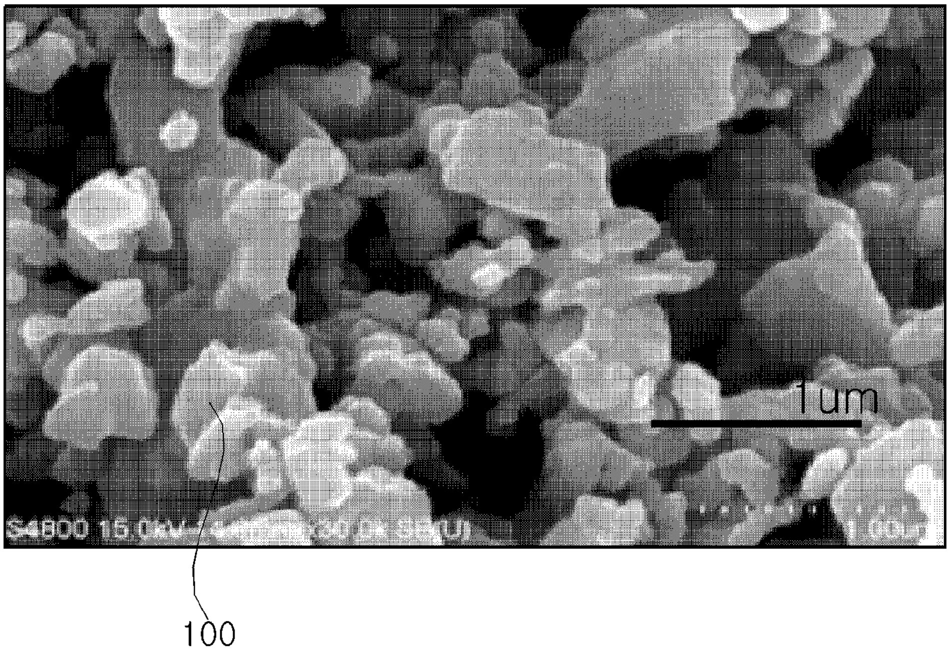

【Figure 4】
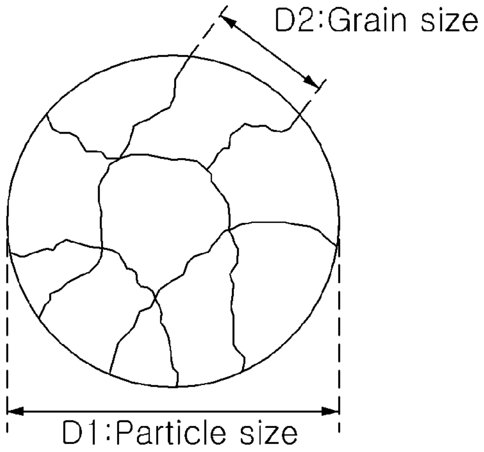

【Figure 5】
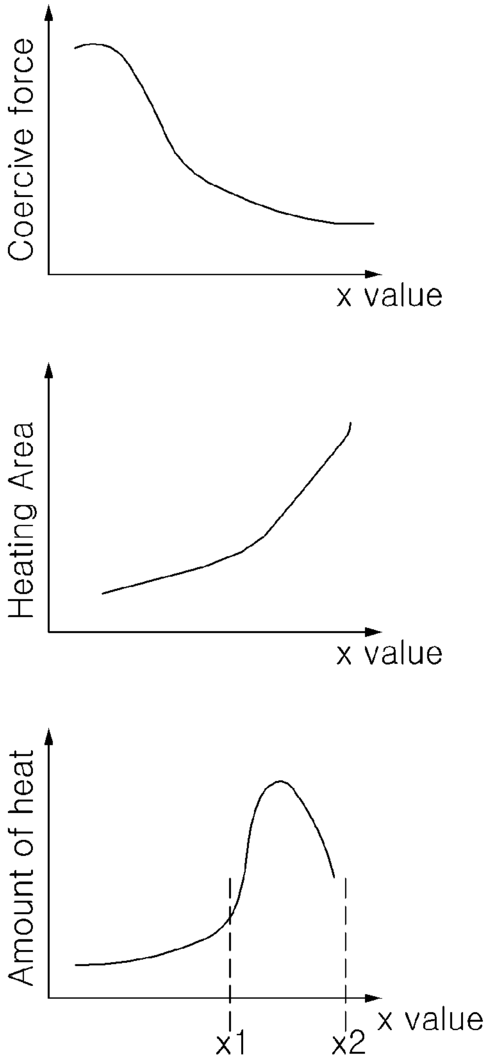

【Figure 6】
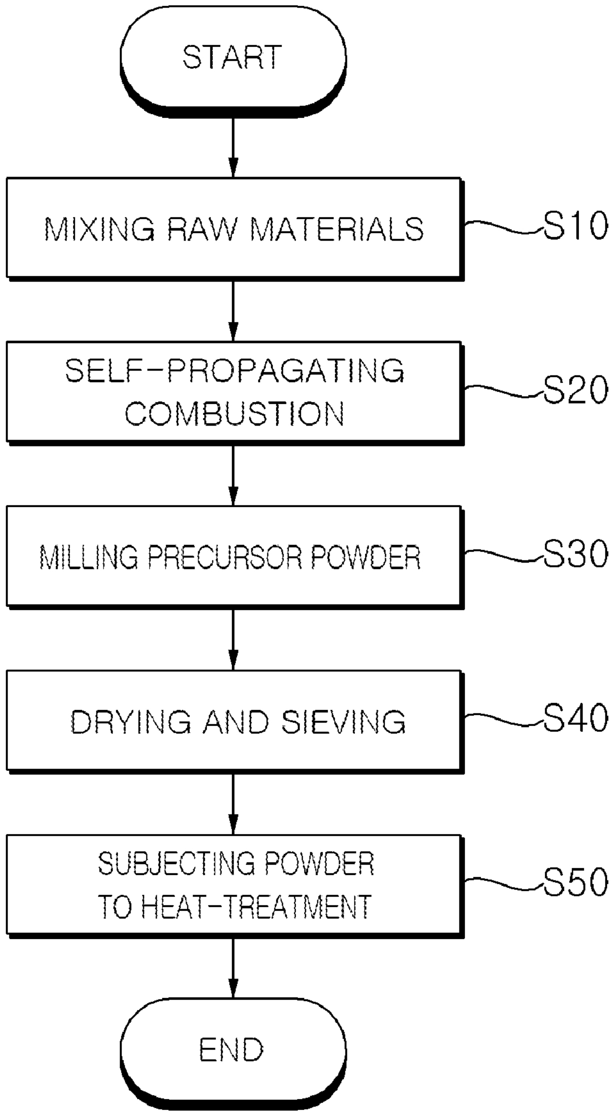

【Figure 7】
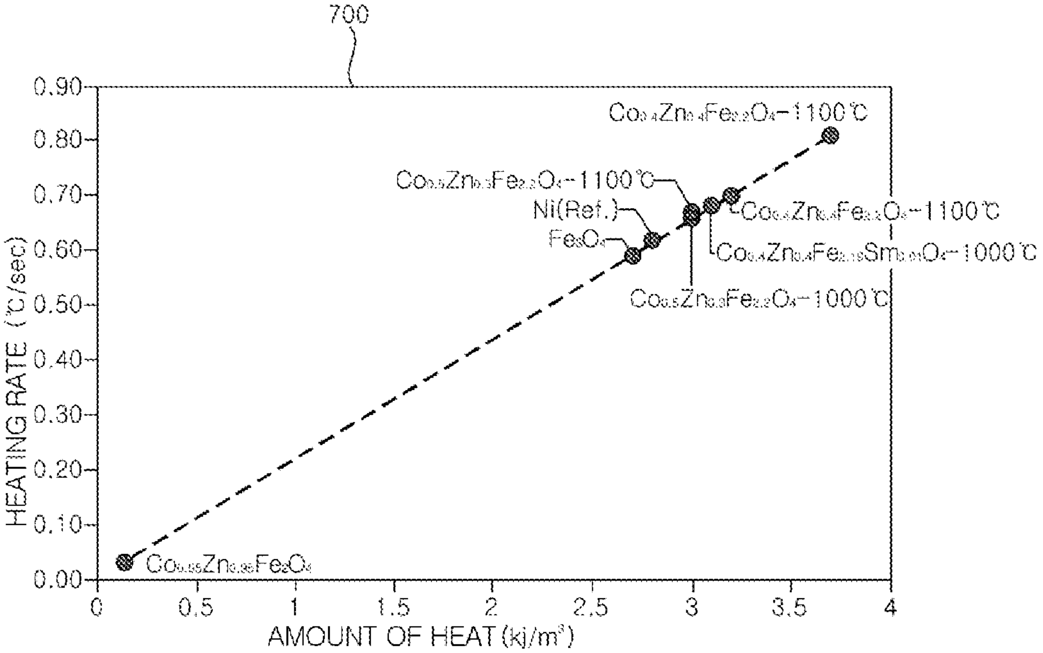

【Figure 8】
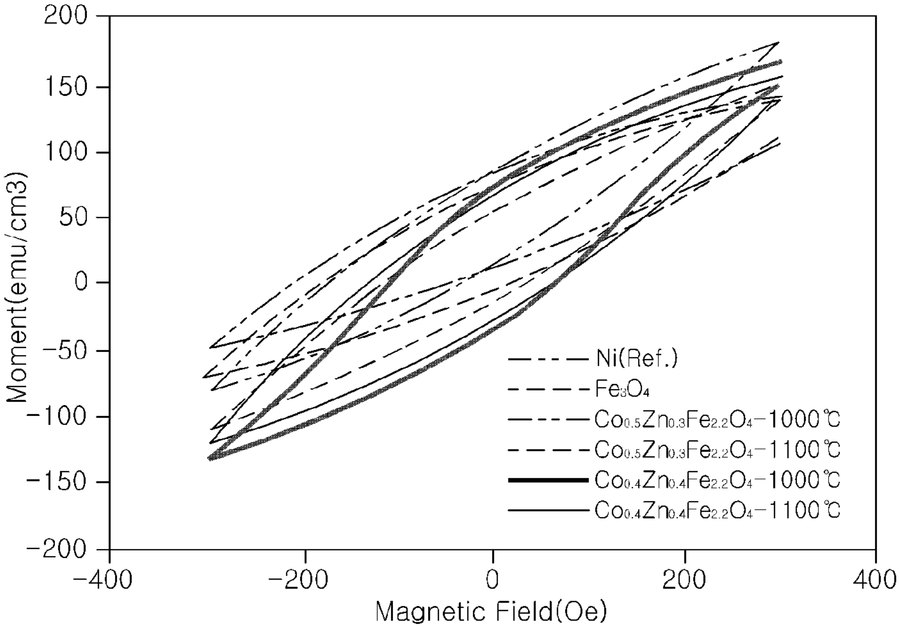

MAGNETIC HEATING ELEMENT, INDUCTION HEATING TYPE ADHESIVE COMPRISING SAME, AND MANUFACTURING METHOD FOR MAGNETIC HEATING ELEMENT

CROSS-REFERENCE TO RELATED APPLICATION(S)

This application is the National Stage filing under 35 U.S.C. 371 of International Application No. PCT/KR2020/007702, filed on Jun. 15, 2020, the contents of which is hereby incorporated by reference herein in its entirety.

TECHNICAL FIELD

The following description relates to a magnetic heating element, an induction heating-type adhesive including the same, and a method of preparing the magnetic heating element, and more particularly to a magnetic heating element prepared with grains and powder particles which are of a specific size, such that the magnetic heating element has a high heating value even when a magnetic field intensity is low, and an induction heating-type adhesive including the magnetic heating element, and a method of preparing the magnetic heating element.

BACKGROUND ART

A method of adhesive bonding by induction heating may be used to bond separated adherends.

The adhesive bonding by induction heating may be carried out using a magnetic heating element and an adhesive.

Induction heating refers to a process in which an external magnetic field is generated with an alternating current flowing through an induction coil, and a magnetic heating element self-heats by the generated external magnetic field.

The magnetic heating element generates heat by induction heating, thereby allowing the adhesive to be melted and cured to bond the separated adherends.

As an existing magnetic heating element, there has been proposed a ferrite-based magnetic heating element including cobalt (Co).

However, the existing magnetic heating element uses superparamagnetism of nanoparticles, such that the nanoparticles having superparamagnetism are required to have a small particle size of 100 nm or less, and the particles lose superparamagnetism if the particle size is greater than or equal to 100 nm. In this case, problems occur in that heat cannot be generated by Neel relaxation and/or Brownian relaxation, and in order to generate heat by Hysteresis loss, an external magnetic field intensity is required to be extremely high.

Furthermore, there is also a problem in that the existing magnetic heating element uses superparamagnetism of the particles, such that in order to prevent aggregation of the nanoparticles, it is required to disperse magnetic powder in a non-magnetic matrix.

DISCLOSURE OF INVENTION

Technical Problem

In order to solve the above problems, it is an objective of the present disclosure to provide a magnetic heating element having a high heating value even when the magnetic field intensity is low, thereby improving adhesive performance of an adhesive and providing high-speed bonding, and an induction heating-type adhesive including the magnetic heating element.

In addition, in order to solve the above problems, it is another objective of the present disclosure to provide a magnetic heating element, in which heat is selectively applied by induction heating to only an adhesion portion, thereby minimizing thermal deformation of elements to be adhered, and an induction heating-type adhesive including the magnetic heating element.

Further, it is yet another objective of the present disclosure to provide a method of preparing a magnetic heating element, in which metal salts are gelated and a self-propagating combustion method is used, thereby providing a simple process and mass production.

The objectives of the present disclosure are not limited to the aforementioned objectives and other objectives not described herein will be clearly understood by those skilled in the art from the following description.

Technical Solution

In order to achieve the above objectives, a magnetic heating element according to an embodiment of the present disclosure has a composition with an atomic ratio represented by the following formula, $$(M^a_{1-x-y}M^b_xFe_y)_1Fe_{2-z}M^c_zO_4.$$

wherein:

- $M^a$ is cobalt (Co), $M^b$ is one or more of zinc (Zn), Copper (Cu), Manganese (Mn), and Magnesium (Mg), and $M^c$ is one or more of samarium (Sm), yttrium (Y), cerium (Ce), europium (Eu), neodymium (Nd), and dysprosium (Dy);
- $0.01 \le x < 0.6$, $0 \le y \le 0.4$, $x+y<1$, $0 \le z \le 0.5$; and
- the magnetic heating element has a grain size of 40 nm to 500 nm, and powder of the magnetic heating element has a particle size of 100 nm to 30 μm.

Meanwhile, in the magnetic heating element according to an embodiment of the present disclosure in order to achieve the above objectives, the grain size may be in a range of 50 nm to 150 nm.

Meanwhile, in the magnetic heating element according to an embodiment of the present disclosure in order to achieve the above objectives, the particle size of the powder may be in a range of 200 nm to 5 μm.

Meanwhile, in the magnetic heating element according to an embodiment of the present disclosure in order to achieve the above objectives, $0.3 \le x \le 0.5$.

Meanwhile, in the magnetic heating element according to an embodiment of the present disclosure in order to achieve the above objectives, the $M^b$ may be zinc (Zn).

Meanwhile, in the magnetic heating element according to an embodiment of the present disclosure in order to achieve the above objectives, the $M^c$ may be samarium (Sm).

Meanwhile, in the magnetic heating element according to an embodiment of the present disclosure in order to achieve the above objectives, the powder may have a spherical shape or a needle shape.

Meanwhile, in order to achieve the above objectives, an induction heating-type adhesive according to an embodiment of the present disclosure, may include a magnetic heating element.

Meanwhile, in the induction heating-type adhesive according to an embodiment of the present disclosure in order to achieve the above objectives, the magnetic heating element may be contained in an amount of 0.1 vol % to 30 vol %.

Meanwhile, in order to achieve the above objectives, a method of preparing a magnetic heating element according to an embodiment of the present disclosure includes: mixing a plurality of metal salts and an additive in distilled water or deionized water; preparing precursor powder by self-propagating combustion of the mixed material; milling the precursor powder; drying and sieving the milled powder; and subjecting the powder to heat treatment, wherein the heat-treated powder has a grain size of 40 nm to 500 nm, and powder of the heat-treated powder has a particle size of 100 nm to 30 μm.

Meanwhile, the method of preparing a magnetic heating element according to an embodiment of the present disclosure in order to achieve the above objectives may further include, after the mixing, heating a mixed solution containing a mixture of the distilled or deionized water, the metal salts, and the additives at a temperature of 60 to 100Ê to gelate the mixed solution.

Meanwhile, in the method of preparing a magnetic heating element according to an embodiment of the present disclosure in order to achieve the above objectives, the preparing of the precursor power by the self-propagating combustion may include: preparing the precursor power by heating the gelated mixed solution at 100Ê or higher and by self-propagating combustion of the gelated mixed solution; and calcinating the prepared precursor powder.

Meanwhile, in the method of preparing a magnetic heating element according to an embodiment of the present disclosure in order to achieve the above objectives, the calcinating of the precursor powder may be performed by heat-treatment at 400Ê.

Meanwhile, in the method of preparing a magnetic heating element according to an embodiment of the present disclosure in order to achieve the above objectives, the milling of the precursor powder may include performing ball milling at a rotation speed of 1 rpm to 500 rpm using balls having a diameter of 1 mm to 5 mm.

Meanwhile, in the method of preparing a magnetic heating element according to an embodiment of the present disclosure in order to achieve the above objectives, the heat treatment may be performed at a temperature of 300Ê to 1000Ê for one to four hours.

Meanwhile, in the method of preparing a magnetic heating element according to an embodiment of the present disclosure in order to achieve the above objectives, the metal salts may include a cobalt (Co) metal salt and one or more metal salts among zinc (Zn), Copper (Cu), Manganese (Mn), and Magnesium (Mg).

Meanwhile, in the method of preparing a magnetic heating element according to an embodiment of the present disclosure in order to achieve the above objectives, the metal salts may further include one or more metal salts among samarium (Sm), yttrium (Y), cerium (Ce), europium (Eu), neodymium (Nd), and dysprosium (Dy).

Meanwhile, in the method of preparing a magnetic heating element according to an embodiment of the present disclosure in order to achieve the above objectives, the additive may be glycine or glycerol.

Meanwhile, in the method of preparing a magnetic heating element according to an embodiment of the present disclosure in order to achieve the above objectives, the grain size may be in a range of 50 nm to 150 nm.

Meanwhile, in the method of preparing a magnetic heating element according to an embodiment of the present disclosure in order to achieve the above objectives, the particle size of the powder may be in a range of 200 nm to 5 μm.

Other detailed matters of the exemplary embodiments are included in the detailed description and the drawings.

Advantageous Effects of Invention

The present disclosure has the following effects.

In a magnetic heating element and an induction heating-type adhesive including the same according to an embodiment of the present disclosure, the magnetic heating element has a high heating value even when a magnetic field intensity is low, thereby improving adhesive performance of an adhesive and providing high-speed bonding.

In addition, in the magnetic heating element and an induction heating-type adhesive including the same according to an embodiment of the present disclosure, heat is selectively applied by induction heating to only an adhesion portion, thereby minimizing thermal deformation of elements to be adhered.

Further, in a method of preparing a magnetic heating element according to an embodiment of the present disclosure, metal salts are gelated and a self-propagating combustion method is used, thereby providing a simple process and mass production.

The effects of the present disclosure are not limited to the aforesaid, and other effects not described herein will be clearly understood by those skilled in the art from the following description of the appended claims.

BRIEF DESCRIPTION OF DRAWINGS

FIG. 1 is a diagram illustrating an induction heating-type adhesive according to an embodiment of the present disclosure and induction heating of the induction heating-type adhesive.

FIG. 2 is a diagram illustrating an example of an adhesive included in the induction heating-type adhesive of FIG. 1.

FIG. 3 is a SEM image of powder of a magnetic heating element according to an embodiment of the present disclosure.

FIG. 4 is a conceptual diagram of powder particles and grains of the magnetic heating element of FIG. 3.

FIG. 5 is a diagram referred to in the description of heating properties according to a change in composition ratio of the magnetic heating element of FIG. 3.

FIG. 6 is a flowchart illustrating a method of preparing a magnetic heating element according to an embodiment of the present disclosure.

FIG. 7 is a diagram illustrating a graph showing comparison of heating rates between a magnetic heating element according to an embodiment of the present disclosure and existing heating elements.

FIG. 8 is a diagram illustrating a graph showing Hysteresis Area of a magnetic heating element according to an embodiment of the present disclosure.

MODE FOR THE INVENTION

Reference will now be made in detail to embodiments of the present disclosure, examples of which are illustrated in the accompanying drawings.

The same reference numerals are used throughout the drawings to designate the same or similar components, and a redundant description thereof will be omitted.

In addition, it will be noted that a detailed description of known arts will be omitted if it is determined that the detailed description of the known arts can obscure the embodiments of the invention. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

In the drawings, the thickness or size of each constituent element is exaggerated, omitted, or schematically illustrated for convenience of description and clarity. Also, the size or area of each constituent element does not entirely reflect the actual size thereof.

It should be understood that the terms "comprise", "include", "have", etc. when used in this specification, specify the presence of stated features, integers, steps, operations, elements, components, or combinations thereof but do not preclude the presence or addition of one or more other features, integers, steps, operations, elements, components, or combinations thereof.

FIG. 1 is a diagram illustrating an induction heating-type adhesive 10 according to an embodiment of the present disclosure and induction heating of the induction heating-type adhesive 10.

In the induction heating-type adhesive 10 according to an embodiment of the present disclosure, an adhesive may be melted by induction heating to bond adherends A and B.

Specifically, referring to FIG. 1, the induction heating-type adhesive 10 may include a magnetic heating element 100 according to an embodiment of the present disclosure and an adhesive 200 containing the magnetic heating element.

When an alternating current (AC) flows through an induction coil while the induction heating-type adhesive 10 is placed in or around the induction coil, a magnetic field is generated around the induction coil. The magnetic heating element 100 contained in the induction heating-type adhesive 10 may generate heat by the magnetic field generated by the induction coil.

In this case, when the adhesive 200 is melted by the heated magnetic heating element 100, its adhesive properties are activated, allowing the adherends A and B to be adhered selectively only at an adhesion portion of the adherends A and B.

Meanwhile, the magnetic heating element 100 contained in the adhesive 200 may be in an amount of about 0.1 vol % (volume %) to about 30 vol % with respect to the adhesive 200.

In the induction heating-type adhesive 10 according to an embodiment of the present disclosure, the magnetic heating element 100 is contained in the above vol % range, thereby smoothly activating the adhesive properties of the adhesive 200 while maintaining excellent formability of the induction heating-type adhesive 10.

If the magnetic heating element 100 is contained in an amount less than 0.1 vol % with respect to the adhesive 200, an amount of heat (or heating value) generated from the magnetic heating element 100 is not sufficient such that it may be difficult to activate adhesive properties of the entire adhesive 200. Meanwhile, if the magnetic heating element 100 is contained in an amount greater than 30 vol % with respect to the adhesive 200, the amount of the magnetic heating element 100 is too excessive for the adhesive 200, such that the induction heating-type adhesive 10 may be broken, causing difficulty in formation.

The adhesive 200 is a component for substantially bonding the adherends A and B, and when melted by the heat generated by the magnetic heating element 100, adhesive properties of the adhesive 200 may be activated.

In order to inductively heating the magnetic heating element 100 according to an embodiment of the present disclosure, a current in a specific frequency range may flow through the induction coil. For example, a current with a frequency of 50 kHz to 10 MHz may flow through the induction coil. By increasing the frequency of the current flowing through the induction coil, a heating rate of the magnetic heating element 100 may increase.

FIG. 2 is a diagram illustrating an example of the adhesive 200 included in the induction heating-type adhesive 10 of FIG. 1.

The adhesive 200 included in the induction heating-type adhesive 10 of the present disclosure may be an organic adhesive, an inorganic adhesive, or a ceramic adhesive.

Referring to (a) of FIG. 2, the adhesive 200, which is an organic adhesive, may be a thermosetting adhesive or a thermoplastic adhesive. In this case, particles of the magnetic heating element 100 according to an embodiment of the present disclosure are dispersed in a polymer, and the polymer is heated by induction heating, such that the adhesive 200 may function as an adhesive.

In the thermosetting adhesive, the adhesive 200 may be a thermosetting resin containing one or more of epoxy, urethane, silicon, unsaturated esters, urea, phenol, and the like.

In the thermoplastic adhesive, the adhesive 20 may be a thermoplastic resin containing one or more of vinyl acetate, polyvinyl alcohol, vinyl chloride, polyvinyl acetate, acryl, saturated polyester, polyamide, polyethylene, and the like.

Meanwhile, referring to (b) of FIG. 2, the adhesive 200, which is an inorganic adhesive, may be a metal adhesive. In this case, metal particles 300 of the adhesive 200 may be mixed with particles of the magnetic heating element 100 according to an embodiment of the present disclosure.

In the metal adhesive, the adhesive 200 may contain, as the metal particles 300, at least one or more of silver (Ag), aluminum (Al), platinum (Pt), tin (Sn), copper (Cu), zinc (Zn), palladium (Pd), and nickel (Ni).

An average particle size of the metal particles 300 may be in a range of 10 nm to 100 μm, preferably in a range of 10 nm to 50 μm, and more preferably in a range of 10 nm to 10 μm, and most preferably in a range of 10 nm to 5 μm.

If the particle size of the metal particles 300 is less than 10 nm, an amount of organic dispersant present on the surface of the metal particles rapidly increases, such that an amount of residual carbon increases during sintering, leading to a decrease in sintering density and electrical conductivity, and if the particle size of the particles is too large, sintering temperature increases, causing thermal damage to a product.

The metal particles 300 may have a spherical shape, a cylindrical shape, a needle shape, a plate shape, a wire shape, etc., and metal particles having a mixture of various shapes may be used depending on applications.

An aspect ratio of the metal particles 300 may vary depending on sintering temperature and initial packing density.

Meanwhile, the adhesive 200 may be a ceramic adhesive. The adhesive 200 may be Glass Frit containing lead (Pb), bismuth (Bi), zinc (Zn), and the like. In this case, the adhesive 200 may be mixed with the particles of the magnetic heating element 100 according to an embodiment of the present disclosure.

In the ceramic adhesive, the adhesive 200 may include $PbO—SiO_2$-based Glass Frit, $PbO—SiO_2—B_2O_3$-based Glass Frit, $ZnO—SiO_2$-based Glass Frit, $ZnO—B_2O_3—SiO_2$-based Glass Frit, $Bi_2O_3—B_2O_3$-$ZbO$-$SiO_2$-based Glass Frit, and the like.

Meanwhile, in order to improve electrical conductivity of the ceramic adhesive, the adhesive 200 may further contain silver (Ag), and in order to control glass transition temperature (Tg), the adhesive 200 may further contain Vanadium (V).

However, materials contained in the adhesive 200 are not limited thereto, and may include materials which may be readily modified in design by those skilled in the art, as long as adhesive properties of the materials may be activated when the materials are melted by heat generated by the magnetic heating element 100.

The adhesive 200 according to an embodiment of the present disclosure may be in paste form or in film form, but is not limited thereto, and may include a range of adhesives which may be readily modified in design by those skilled in the art.

FIG. 3 is a SEM image of powder of the magnetic heating element 100 according to an embodiment of the present disclosure, and FIG. 4 is a conceptual diagram of powder particles and grains of the magnetic heating element 100 of FIG. 3.

As described above, the magnetic heating element 100 according to an embodiment of the present disclosure may be heated by a magnetic field generated by the induction coil and may melt the adhesive 200 to activate adhesive properties of the adhesive 200.

The magnetic heating element 100 may be a metal-based magnetic heating element containing cobalt (Co) or a ceramic-based magnetic heating element. Specifically, the particles of the magnetic heating element 100 may have a composition with an atomic ratio represented by the following compositional formula 1.

$$\left(M^a_{1-x-y}M^b_xFe_y\right)_1Fe_{2-z}M^c_zO_4 \qquad \text{[Compositional Formula 1]}$$

wherein $M^a$ may be cobalt (Co), $M^b$ may be divalent cation metal, and $M^c$ may be trivalent cation metal.

Specifically, $M^b$ may be divalent cation metal, such as zinc (Zn), Copper (Cu), Manganese (Mn), Magnesium (Mg), etc., and $M^c$ may be trivalent cation metal, such as samarium (Sm), yttrium (Y), cerium (Ce), europium (Eu), neodymium (Nd), dysprosium (Dy), etc.

In addition, in the compositional formula, x, y, and z may satisfy a range of $0.01 \le x < 0.6$, $0 \le y \le 0.4$, $x+y<1$, $0 \le z \le 0.5$.

Meanwhile, in the compositional formula, $M^b$ may be zinc (Zn), and $M^c$ may be samarium (Sm). As an example of a material that satisfies the compositional formula, the magnetic heating element 100 may be $Co_{0.5}Zn_{0.3}Fe_{2.2}O_4$, $Co_{0.4}Zn_{0.4}Fe_{2.2}O_4$, $Co_{0.4}Zn_{0.4}Fe_{2.19}Sm_{0.01}O_4$, or $Co_{0.4}Zn_{0.4}Fe_{2.15}Sm_{0.05}O_4$, etc., but is not limited thereto.

In this case, in the magnetic heating element 100 that satisfies the compositional formula, an average grain size may be in a range of 40 nm to 500 nm. Meanwhile, the grain size may be preferably in a range of 50 nm to 300 nm, and most preferably in a range of 50 nm to 150 nm.

If the grain size of the magnetic heating element 100 is less than or equal to 40 nm or greater than or equal to 500 nm, coercive force is too low such that an amount of heat of the magnetic heating element 100 may decrease rapidly.

Meanwhile, in the magnetic heating element 100 that satisfies the compositional formula, an average particle size of the magnetic heating element 100 may be in range of 100 nm to 30 μm. In the present specification, the "particle size" refers to not only a diameter of a spherical particle, but also a maximum length across an aspherical particle. Meanwhile, a particle size of the powder of the magnetic heating element 100 may be preferably in a range of 200 nm to 10 μm, and most preferably in a range of 200 nm to 5 μm.

If the particle size of the powder of the magnetic heating element 100 is less than or equal to 100 nm, surface energy of the power increases, such that the powder may be easily aggregated, and thus are difficult to be used as a mixture with other materials, and may be easily oxidized. Meanwhile, if the particle diameter of the powder is greater than or equal to 30 μm, magnetic properties of the powder decrease, such that an amount of heat of the magnetic heating element 100 may decrease.

The powder of the magnetic heating element 100 illustrated in FIG. 3 is observed to have a particle size of about 200 nm to 700 nm.

Referring to FIG. 4, in the powder of the magnetic heating element 100, a plurality of grains may be present in a single particle. A particle size D1 of the particles may be in a range of 100 nm to 30 μm, in which case a size D2 of the grains may be in a range of 40 nm to 500 nm. Meanwhile, the particle size D1 of the particles may be in a range of 200 nm to 5 μm, in which case the size D2 of the grains may be in a range of 50 nm to 150 nm.

As the particle size of the powder and the size of grains of the magnetic heating element 100 are maintained in the range, an amount of heat of the magnetic heating element 100 may be maximized, thereby achieving effective heating properties.

Meanwhile, the powder of the magnetic heating element 100 may have a spherical shape or a needle shape, or may have a mixture of a spherical shape and a needle shape.

FIG. 5 is a diagram referred to in the description of heating properties according to a change in composition ratio of the magnetic heating element 100.

In the above Compositional Formula 1, x, y, and z may satisfy a range of $0.01 \le x < 0.6$, $0 \le y \le 0.4$, $x+y<1$, $0 \le z \le 0.5$.

In the above Compositional Formula, as a value of x increases, an amount of divalent metal cation (e.g., Zn) increases, and an amount of cobalt (Co) decreases. As the amount of cobalt (Co) contained in the magnetic heating element 100 increases, coercive force of the magnetic heating element 100 increases, and as the amount of divalent metal cation (e.g., Zn) increases, the coercive force of the magnetic heating element 100 decreases.

Accordingly, as the value of x increases, the coercive force of the magnetic heating element 100 decreases as illustrated in (a) of FIG. 5.

Further, as the value of x increases, a heating area of the magnetic heating element 100 increases as illustrated in (b) of FIG. 5. Accordingly, as illustrated in (c) of FIG. 5, the magnetic heating element 100 exhibits a high heating value when the value of x is in a specific range (range of x1 to x2).

In the above Compositional Formula, if the value of x is smaller than 0.01, the heating area of the magnetic heating element 100 excessively decreases, leading to a decrease in the amount of heat of the magnetic heating element 100. Meanwhile, if the value of x is greater than 0.6, the coercive force of the magnetic heating element 100 excessively decreases, leading to a decrease in the amount of heat of the magnetic heating element 100.

In the above Compositional Formula, the value of x may be greater than or equal to 0.01 and smaller than or equal to 0.6. Preferably, the value of x may be greater than or equal to 0.3 and smaller than or equal to 0.5.

FIG. 6 is a flowchart illustrating a method of preparing the magnetic heating element 100 according to an embodiment of the present disclosure.

The method of preparing the magnetic heating element according to an embodiment of the present disclosure may include mixing raw materials (S10), self-propagating combustion (S20), milling precursor powder (S30), drying and sieving (S40) the powder, and subjecting the powder to heat-treatment (S50).

First, in the mixing of the raw materials, a plurality of metal salts and an additive are mixed as raw materials in distilled water or deionized water (S10).

The metal salts may be a complex compound with metal ions and an organic material consisting of at least one or more of C, H, S, O, and N. The metal salts include cobalt (Co) metal salt and one or more metal salts among zinc (Zn), Copper (Cu), Manganese (Mn), and Magnesium (Mg). Meanwhile, the metal salts may further include one or more metal salts among samarium (Sm), yttrium (Y), cerium (Ce), europium (Eu), neodymium (Nd), and dysprosium (Dy).

For example, the metal salts may include iron nitrate nonahydrate ($Fe(NO_3)_3 \cdot 9H_2O$), cobalt nitrate hexahydrate ($Co(NO_3)_2 \cdot 6H_2O$), and zinc nitrate hexahydrate ($Zn(NO_3)_2 \cdot 6H_2O$, but is not limited thereto.

The additive may be glycine ($C_2H_5NO_2$) or glycerol.

The deionized water is water from which ions are removed.

Then, a mixed solution, containing a mixture of the distilled or deionized water, the metal salts, and the additive, is heated at a temperature of 60° C. to 100° C. to be gelated. If the mixed solution is heated and gelated at a temperature less than 60° C., the mixed solution of the metal salts and the additive may be hardened without a gelation reaction. Meanwhile, if the mixed solution is heated and gelated at a temperature exceeding 100° C., the additive is burned before phase is formed, such that the phase may not be fully formed. Accordingly, the gelation temperature is preferably maintained within the above range.

Subsequently, in the self-propagating combustion, the mixed raw materials may be formed into precursor powder by self-propagating combustion (S20). Specifically, the self-propagating combustion may include preparing the precursor powder by heating the gelated mixed solution at a temperature of 100° C. or higher and by self-propagating combustion of the gelated mixed solution, and calcinating the prepared precursor powder.

In the self-propagating combustion of the present disclosure, if the mixed solution is heated at a temperature less than 100° C., the self-propagating combustion does not occur.

Here, the self-propagating combustion refers to a reaction that spontaneously propagates and continues even when no energy is supplied from an external source. Accordingly, by using the self-propagating combustion reaction, a compound between ceramic and metal may be formed.

The self-propagating combustion reaction occurs at a high temperature. Accordingly, when a compound is formed by the self-propagating combustion reaction, product purity increases, the reaction proceeds very fast, and no separate heating device is required, with high productivity and simple structure of a reaction device.

That is, in the method of preparing the magnetic heating element according to an embodiment of the present disclosure, metal salts are gelated and the self-propagating combustion method is used, thereby providing a simple process and mass production.

Meanwhile, the calcinating of the precursor powder may be performed by heat-treatment at 400° C. Preferably, the precursor powder may be heat-treated at a temperature of about 350° C. to 450° C. The reaction is preferably carried out in the above temperature range, because the heat-treatment temperature is required to be in a range of about 350° C. to 450° C. in order to remove remaining organic materials and impurities.

The calcinating of the precursor powder may be performed for about one hour in the above temperature range. Meanwhile, a period of time for calcinating the precursor powder is not limited thereto, and the calcination may be performed for several minutes to several tens of minutes.

Then, the milling of the precursor powder may be performed (S30). Specifically, the milling may be a ball-milling process at a rotation speed of about 1 rpm to 500 rpm using balls having a diameter of 1 mm to 5 mm.

By the ball-milling process, the precursor powder may be milled into particles with a predetermined size.

Subsequently, the drying and sieving may be performed (S40). After drying the milled powder for a predetermined period of time, sieving or sifting of the powder may be performed. Accordingly, by removing particles, having a size greater or smaller than or equal to a predetermined size, from the milled powder, particle size uniformity of the powder may increase.

Then, in the heat-treatment, the sifted powder may be subjected to heat-treatment (S50). Specifically, the heat-treatment may be performed by subjecting the powder to heat-treatment for one to four hours at a temperature of 300° C. to 1000° C. Meanwhile, the heat-treatment may be performed by subjecting the powder to heat-treatment for about two hours at a temperature of 600° C. to 1100° C.

In the heat-treatment (S50), an atmospheric condition may include at least one of a mixed gas containing carbon monoxide (CO) and carbon dioxide ($Co_2$), a mixed gas containing hydrogen ($H_2$) and vapor ($H_2O$), and inert gas (Ar, etc.) and oxygen ($O_2$).

However, the atmospheric condition in the heat-treatment (S50) is not limited thereto, and may include conditions which may be readily modified in design by those skilled in the art.

By carrying out the heat-treatment process, the powder may be prepared with a predetermined grain size and magnetic properties.

In the method of preparing the magnetic heating element 100 according to an embodiment of the present disclosure, the heat-treatment (S50) is performed under the above condition of temperatures and heating times, such that powder may be prepared which allows for effective magnetic heating.

In the heat-treated powder of the magnetic heating element 100, an average grain size is in a range of 40 nm to 500 nm, and an average particle size of the heat-treated powder is in a range of 100 nm to 30 μm.

Meanwhile, in the heat-treated powder of the magnetic heating element 100, an average grain size is preferably in a range of 50 nm to 300 nm, and most preferably in a range of 50 nm to 150 nm.

If the average grain size of the magnetic heating element 100 is less than or equal to 40 nm or greater than or equal to 500 nm, coercive force is too low such that an amount of heat of the magnetic heating element 100 may decrease rapidly.

Meanwhile, in the heat-treated powder of the magnetic heating element 100, an average particle size of the heat-treated powder may be preferably in a range of 200 nm to 10 μm, and most preferably in a range of 200 nm to 5 μm.

If the powder of the magnetic heating element 100 has a particle size of less than or equal to 100 nm, surface energy of the powder increases such that the powder easily aggregates, and the powder is difficult to be used in mixture with another material and is prone to oxidation. Meanwhile, if the powder has a particle size of greater than or equal to 30 μm, magnetic properties of the powder decrease, thereby leading to a decrease in the amount of heat of the magnetic heating element 100.

Meanwhile, the prepared powder of the magnetic heating element 100 may be mixed with the adhesive 20. Specifically, the powder of the magnetic heating element 100 is placed and mixed with an adhesive in paste form by using an agitator and the like, to form the induction heating-type adhesive 10.

The induction heating-type adhesive 10 in paste form may be used per se, or may be used as the induction heating-type adhesive 10 in film form by curing the adhesive 200.

Meanwhile, in the method of preparing the magnetic heating element 100 according to an embodiment of the present disclosure, surface treatment of the particles of the magnetic heating element 100 may be further carried out after the heat-treatment (S50). Specifically, a coating process using unsaturated fatty acid, such as oleic acid, may be performed on the heat-treated particles of the magnetic heating element 100. However, the coating process is not limited thereto, and a surface treatment process with various organic materials may be performed to disperse the particles of the magnetic heating element 100 throughout the adhesive.

Meanwhile, in the method of preparing the magnetic heating element 100 of the present disclosure, various processes, such as deposition, mechanical milling, precipitation, liquid phase reduction process, etc., may be used in addition to the aforementioned self-propagating combustion synthesis.

FIG. 7 and the following Table 1 are a graph and a table, respectively, showing comparison of heating rates between the magnetic heating element 100 according to an embodiment of the present disclosure and existing heating elements, and FIG. 8 shows a graph of Hysteresis Area of the magnetic heating element according to an embodiment of the present disclosure.

In FIGS. 7, 8, and Table 1, for induction heating of the heating elements, a current of the same frequency (360 kHz) was applied to the induction coil, and an external magnetic field with the same intensity (300 Oe) was applied to all the heating elements.

TABLE 1

| Composition of heating element | Heating value ($KJ/m^3$) | Heating rate (° C./sec) |
|---|---|---|
| Ni (Ref.) | 2.8 $KJ/m^3$ | 0.61° C./sec |
| $Fe_3O_4$ | 2.7 $KJ/m^3$ | 0.58° C./sec |
| $Co_{0.95}Zn_{0.05}Fe_2O_4$ | 0.14 $KJ/m^3$ | 0.03° C./sec |
| $Co_{0.5}Zn_{0.3}Fe_{2.2}O_4$-1000° C. | 3.0 $KJ/m^3$ | 0.65° C./sec |
| $Co_{0.5}Zn_{0.3}Fe_{2.2}O_4$-1100° C. | 3.0 $KJ/m^3$ | 0.66° C./sec |
| $Co_{0.4}Zn_{0.4}Fe_{2.2}O_4$-1000° C. | 3.7 $KJ/m^3$ | 0.81° C./sec |
| $Co_{0.4}Zn_{0.4}Fe_{2.2}O_4$-1100° C. | 3.2 $KJ/m^3$ | 0.70° C./sec |
| $Co_{0.4}Zn_{0.4}Fe_{2.19}Sm_{0.01}O_4$-1000° C. | 3.1 $KJ/m^3$ | 0.68° C./sec |

A heating element containing nickel (Ni) was used as a reference for comparison of the heating elements, and an oxide-based magnetic heating element containing $Fe_3O_4$ and an oxide-based magnetic heating element $Co_{0.95}Zn_{0.05}Fe_2O_4$ containing cobalt were used as comparative examples. As examples of the magnetic heating element 100 of the present disclosure, $Co_{0.5}Zn_{0.3}Fe_{2.2}O_4$ and $Co_{0.4}Zn_{0.4}Fe_{2.2}O_4$ which were heat-treated at 1000° C. and 1100° C., and $Co_{0.4}Zn_{0.4}Fe_{2.19}Sm_{0.01}O_4$ heat-treated at 1000° C. were used. Referring to FIG. 7 and Table 1, it can be observed that the magnetic heating elements 100 of the present disclosure have heating values which are higher by about 7%, 7%, 32%, 14%, and 11%, respectively, compared to the heating element containing nickel. Also, it can be observed that the heating rates increase in proportion to the amount of heat per unit area.

Meanwhile, it can be confirmed that the existing oxide-based magnetic heating element $Co_{0.95}Zn_{0.05}Fe_2O_4$, containing cobalt and consisting of the same elements as an example of the magnetic heating element 100 of the present disclosure, has a relatively very low heating value when an external magnetic field intensity is 300 Oe. It can be confirmed that the heating rate and the amount of heat per unit area of the magnetic heating element 100 of the present disclosure are at least 20 times higher when compared with the existing magnetic heating element.

As described above, when the external magnetic field intensity is 300 Oe, the magnetic heating element 100 of the present disclosure may have a higher heating value than the existing heating elements, thereby improving adhesive performance of the adhesive and providing high-speed bonding in an environment where the external magnetic field intensity is low.

Meanwhile, in FIG. 7 and Table 1, heating value characteristics may vary depending on heat-treatment temperature applied to the magnetic heating element 100 of the present disclosure. If the magnetic heating element 100 has a composition ratio of $Co_{0.5}Zn_{0.3}Fe_{2.2}O_4$, no difference occurs in heating value according to heat-treatment temperature, but if the magnetic heating element 100 has a composition ratio of $Co_{0.4}Zn_{0.4}Fe_{2.2}O_4$, it can be confirmed that the magnetic heating element heat-treated at 1000° C. has a higher heating value than the heating value of the magnetic heating element heat-treated at 1100° C. Accordingly, by setting an appropriate heat-treatment temperature according to the composition ratio of the magnetic heating element 100, the heating characteristics of the magnetic heating element 100 may be improved.

Referring to FIG. 8, in the case where the external magnetic field intensity is 300 Oe, the respective heating elements have different hysteresis curves.

As examples of the magnetic heating element 100 of the present disclosure, $Co_{0.5}Zn_{0.3}Fe_{2.2}O_4$ and $Co_{0.4}Zn_{0.4}Fe_{2.2}O_4$ which were heat-treated at 1000° C. and 1100° C. were used, and as comparative examples, an oxide-based magnetic heating element containing nickel (Ni) and an oxide-based magnetic heating element containing $Fe_3O_4$ were used.

In FIG. 8, it can be confirmed that the magnetic heating element 100 of the present disclosure has a larger Hysteresis area than the heating elements in the comparative examples.

The Hysteresis area in FIG. 8 indicates the amount of energy lost by each heating element, and is proportional to the amount of heat of each heating element. That is, the magnetic heating element 100 of the present disclosure has a larger amount of energy loss and a larger amount of heat than the existing heating elements.

Accordingly, compared with the adhesive including the existing heating elements, the induction heating-type adhesive 10 including the magnetic heating element 100 of the present disclosure exhibits high adhesive performance even when the external magnetic field intensity is low, thereby providing high-speed bonding.

In addition, in the induction heating-type adhesive 10 including the magnetic heating element 100 of the present disclosure, heat is selectively applied by induction heating to only an adhesion portion, thereby minimizing thermal deformation of elements to be adhered.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A magnetic heating element comprising a composition with an atomic ratio represented by the following formula, $$(M^a_{1-x-y}M^b_xFe_y)_1Fe_{2-z}M^c_zO_4.$$

wherein:

$M^a$ is cobalt (Co), $M^b$ is one or more of zinc (Zn), Copper (Cu), Manganese (Mn), and Magnesium (Mg), and $M^c$ is one or more of samarium (Sm), yttrium (Y), cerium (Ce), europium (Eu), neodymium (Nd), and dysprosium (Dy);

$0.01 \leq x < 0.6$, $0 \leq y \leq 0.4$, $x+y<1$, $0<z \leq 0.5$; and the magnetic heating element has a grain size of 40 nm to 500 nm, and a powder of the magnetic heating element has a particle size of 100 nm to 30 μm.

2. The magnetic heating element of claim 1, wherein the grain size is in a range of 50 nm to 150 nm.

3. The magnetic heating element of claim 2, wherein the particle size of the powder is in a range of 200 nm to 5 μm.

4. The magnetic heating element of claim 1, wherein $0.3 \leq x \leq 0.5$.

5. The magnetic heating element of claim 4, wherein the $M^b$ is zinc (Zn).

6. The magnetic heating element of claim 1, wherein the $M^c$ is samarium (Sm).

7. The magnetic heating element of claim 6, wherein the powder has a spherical shape or a needle shape.

8. An induction heating-type adhesive comprising an adhesive and the magnetic heating element of claim 1.

9. The induction heating-type adhesive of claim 8, wherein the magnetic heating element is contained in an amount of 0.1 vol % to 30 vol %.

* * * * *